United States Patent

Van Erden et al.

[11] Patent Number: 5,387,388
[45] Date of Patent: Feb. 7, 1995

[54] METHOD FOR PRODUCING ORIENTED PLASTIC STRAP

[75] Inventors: Donald L. Van Erden, Wildwood; Manuel C. Enriquez, Morton Grove; Donald W. Noren, Glenview, all of Ill.

[73] Assignee: Illinois Tool Works Inc., Glenview, Ill.

[21] Appl. No.: 958,803

[22] Filed: Oct. 9, 1992

[51] Int. Cl.⁶ .............................................. B29C 43/22
[52] U.S. Cl. .................................. 264/280; 264/288.4; 425/363
[58] Field of Search .................. 264/280, 288.4; 425/363

[56] References Cited

U.S. PATENT DOCUMENTS

| | | | |
|---|---|---|---|
| 3,083,410 | 4/1963 | McGlamery | 264/280 |
| 3,290,420 | 12/1966 | Orser | 264/280 X |
| 3,351,697 | 11/1967 | Hufnagel et al. | 264/288.4 |
| 3,354,023 | 11/1967 | Dunnington et al. | 264/175 X |
| 3,376,601 | 4/1968 | Seanor et al. | 425/143 X |
| 3,394,045 | 7/1968 | Gould . | |
| 3,619,460 | 11/1971 | Chill | 264/288.4 |
| 3,651,196 | 3/1972 | Starkweather | 264/280 X |
| 4,408,974 | 10/1983 | Comerlo | 264/288.4 X |
| 4,428,720 | 1/1984 | Van Erden et al. | 425/66 |
| 5,049,347 | 9/1991 | Magill et al. | 264/280 |

OTHER PUBLICATIONS

Tadmor, Z. et al. *Principles of Polymer Processing,* New York, John Wiley & Sons (1979), pp. 363–372, 442–447, 661–663.

Primary Examiner—James Lowe
Attorney, Agent, or Firm—Schwartz & Weinrieb

[57] ABSTRACT

A method for producing an oriented plastic strap having a predetermined desired thickness for use in strapping packages and the like is passed between a pair of cylinders or rollers placed closely together at a desired nip for reducing the thickness of the sheet. One roller is rotated at a faster lineal rate of speed than the other, and the rollers rotate in opposite directions. This method achieves milling and stretching of the material substantially simultaneously at the nip of the rollers.

19 Claims, 1 Drawing Sheet

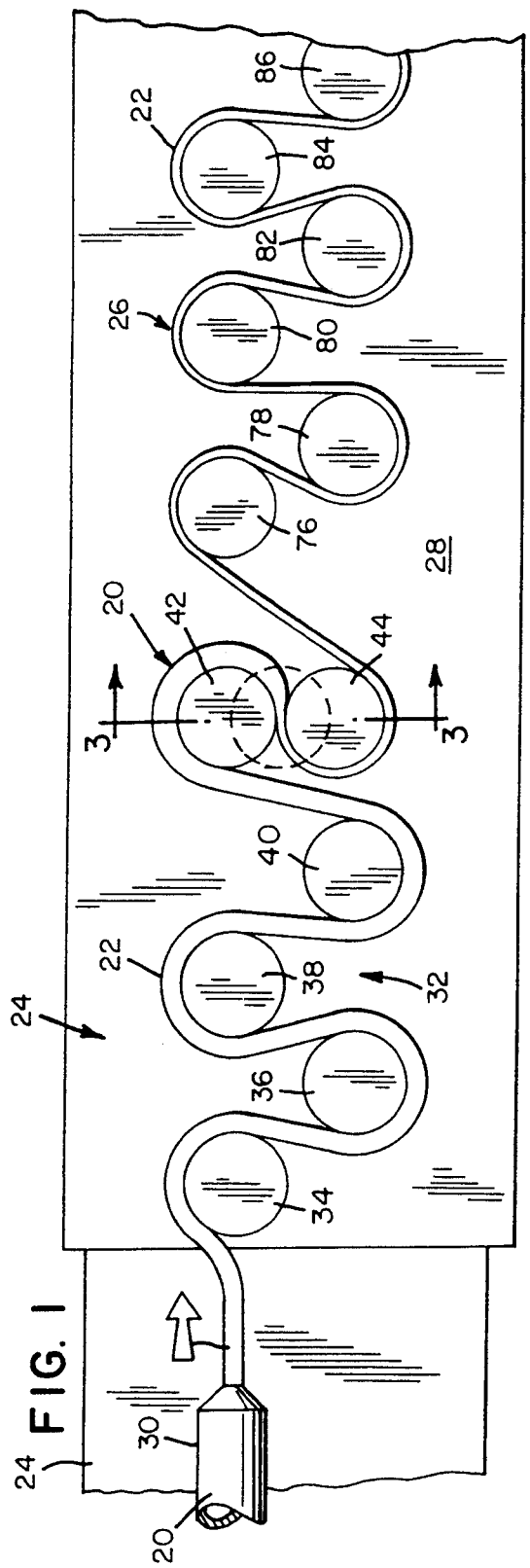
FIG. 1
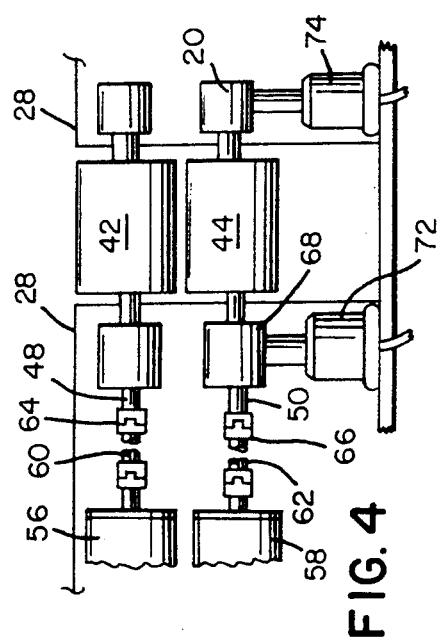
FIG. 4
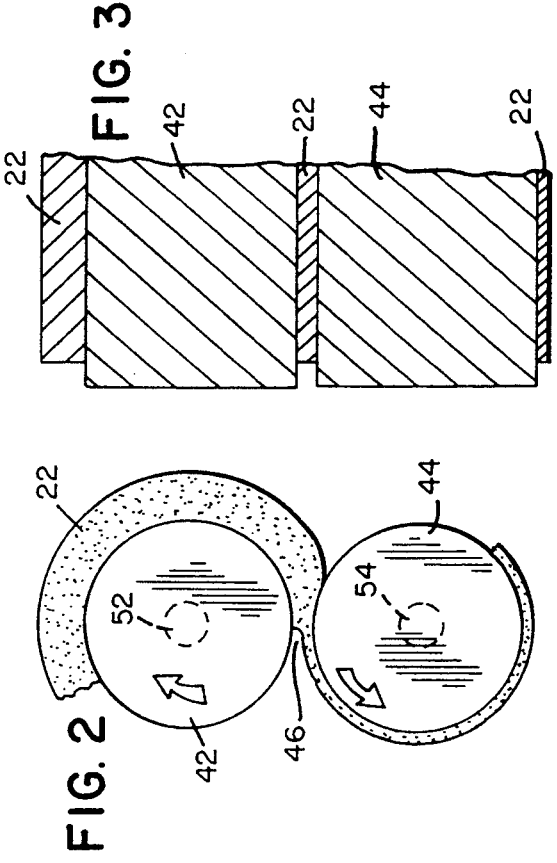
FIG. 3
FIG. 2

METHOD FOR PRODUCING ORIENTED PLASTIC STRAP

FIELD OF THE INVENTION

The present invention is directed to a method and apparatus for producing an oriented plastic strap and more particularly to a method and apparatus for milling and stretching a plastic sheet into strap stock material having a predetermined desired thickness.

BACKGROUND OF THE INVENTION

In a typical prior art stretching method, such as a SIGNODE ® process, a cast sheet of thermoplastic material, for example, polypropylene, is first reduced in size by rolling it through a pair of closely spaced milling rollers or cylinders that rotate in opposite directions. After the thickness of the sheet is reduced, the sheet is drawn and stretched out of the milling rollers by a series of orienting rollers or a bridle assembly to its final desired size.

Another prior art method that is commonly used is a process called the short gap method and is generally comprised of an entry bridle, a stretching assembly and an exit bridle. A slow speed, heated bridle assembly advances a cast sheet of material, usually film, to a stretching assembly. The stretching assembly is comprised of a pair of rollers or cylinders set a distance apart. The first roller rotates at the same speed as the entry bridle. The second roller is rotating faster than the first roller and at the same speed as the exit bridle. Thus, as the film passes through the assembly, it is stretched to its final desired size.

These prior art methods present several disadvantages. The properties of the straps produced by these methods provide limited increases in strength without significant decreases in other desired properties. Also, substantial necking occurs as the sheet is stretched over the distance between the rollers.

The present invention presents a novel milling and stretching apparatus and method intended to minimize these problems, as well as to present several other improvements.

OBJECTS OF THE INVENTION

A general object of the present invention is to provide a novel apparatus and method for producing oriented plastic strap.

Another object of the present invention is to provide a novel apparatus capable of milling and stretching a workpiece into a strap having a predetermined desired thickness in a single pass through a single pair of rollers.

It is a further object of the present invention to provide a novel method and apparatus for producing oriented plastic strap having significantly increased tensile strength and resistance to splitting as compared to straps produced by heretofore known methods and apparatus.

It is a specific object of the present invention to provide a strap with a high tensile strength, high resistance to splitting and improved welding characteristics.

SUMMARY OF THE INVENTION

Briefly, and in accordance with the foregoing, the present invention comprises an apparatus and method for producing an oriented plastic strap having a predetermined desired thickness for use in strapping packages and the like. A plastic workpiece or sheet is passed between a pair of cylinders or rollers placed closely together at a desired nip for reducing the thickness of the sheet. One roller is rotated at a faster lineal rate of speed than the other, and the rollers rotate in opposite directions. This apparatus and method therefore achieves milling and stretching of the material substantially simultaneously at the nip of the rollers.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements throughout the several views in which:

FIG. 1 is a simplified fragmentary front view of an apparatus for producing oriented plastic strap according to the present invention;

FIG. 2 is an enlarged simplified front view of the milling and stretching rollers shown in FIG. 1;

FIG. 3 is an enlarged partial cross-sectional view of FIG. 1 taken along line 3—3 of FIG. 1, and FIG. 4 is a simplified reduced fragmentary partial sectional view of the milling and stretching roller system without the sheet of plastic as seen along a line or direction parallel to line 3—3.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

As illustrated schematically in FIG. 1, the present invention includes a zero gap assembly 20 for milling and stretching or elongating a sheet or workpiece 22 into a thin strap stock material. The present invention is discussed with only a single sheet or workpiece 22, however, it is to be understood that more than one sheet or workpiece 22 may be passed through the assembly at a time. The phrase "zero gap" as used herein refers to the concept of substantially eliminating any gap between a step of milling and a step of stretching a sheet or workpiece In other words, the steps of milling and stretching are accomplished substantially simultaneously. The zero gap assembly 20 is located between a feeding assembly 24 and an exit bridle assembly 26 on a frame or support 28.

The feeding assembly 24 may take any one of several forms, and as shown in FIG. 1, includes an extruding machine 30 for extruding a sheet or workpiece 22 of stock material and an entry bridle assembly 32.

The extruding machine 30 produces a sheet or workpiece 22 of suitable material, such as polypropylene and the like, to the entry bridle assembly 32 for feeding into the zero gap assembly 20. The sheet 22 may also be pre-heated in the entry bridle assembly 32 in order to enhance the working properties of the sheet material.

The entry bridle assembly 32 includes a plurality of rollers or cylinders 34, 36, 38 and 40 mounted by suitable means, such as a shaft, not shown, on the frame or support 28. The rollers 34, 36, 38 and 40 may be solid or hollow. In the preferred embodiment, as shown in the figures, the rollers 34, 36, 38 and 40 are essentially only used to properly deliver the sheet 22 for feeding into the zero gap assembly 20, and do not substantially contribute to the stretching or the milling of the sheet 22. A different number of rollers may be employed than the amount shown in FIG. 1. The rollers 34, 36, 38 and 40 are arranged along two rows with bottom row rollers 36 and 40 being spaced between and at a distance beneath the top row rollers 34 and 38. Rollers 34 and 38 rotate in a clockwise direction while rollers 36 and 40 rotate in a counterclockwise direction so that when the sheet 22 is wound around the entry bridle assembly 32, it travels through the rollers 34, 36, 38 and 40. Each of the rollers 34, 36, 38 and 40 are rotated at a uniform speed by suitable means, not shown, such as a motor and shaft assembly. All of the rollers 34, 36, 38 and 40 rotate at essentially the same speed or lineal surface velocity as a top roller 42 in the zero gap assembly 20 which will be discussed in greater detail herein.

After the sheet 22 passes through the feeding assembly 24, it advances to the zero gap assembly 20 for milling and stretching into a finished sheet 22 having a predetermined desired thickness. The zero gap assembly 20 includes a pair of rollers or cylinders 42 and 44 that are rotatably mounted in opposing relationship. The nip 46, that is, the minimum distance between the rollers 42 and 44, can be varied greatly depending on the desired finished thickness of the sheet 22.

The zero gap rollers 42 and 44 may be solid or hollow and may be heated by well-known means, not shown, such as circulating a heated fluid within the roller 42 or 44, in order to enhance the stretching properties of the sheet material. The zero gap rollers 42 and 44 may also be flat, as shown in the figures, or shaped in order to change the shape of the sheet 22 as it passes through the rollers 42 and 44.

As best shown in FIG. 2, the top roller 42 is driven in a clockwise direction, as shown by an arrow, and the bottom roller 44 is driven in a counterclockwise direction, as shown by an arrow. The sheet 22 first feeds around a portion of the top roller's 42 circumference, then through the nip 46 defined between the rollers 42 and 44, and then around a portion of the bottom roller's 44 circumference. The sheet 22 contacts over half of the circumference of each one of the rollers 42 and 44 as it passes around the rollers 42 and 44. Each roller 42 and 44 contacts an opposite side of the sheet 22.

In the preferred embodiment, as shown in the figures and as described in detail herein, the mill rollers 42 and 44 are situated in a top-bottom arrangement. However, it is to be understood that the rollers 42 and 44 may be placed in a side-by-side arrangement. In a side-by-side arrangement, the top roller 42 becomes the first roller the sheet contacts while the bottom roller 44 becomes the second roller the sheet contacts.

As best shown in FIG. 4, the zero gap rollers 42 and 44 are respectively connected to shafts 48 and 50 fixed to their centers 52 and 54. Drive means 56 and 58, such as electric motors, are mounted on the support 28 and drive the rollers 42 and 44, respectively, through shafts 60 and 62 that are connected to shafts 48 and 50 by a coupling 64 and 66, respectively. Coupling 66 may take the form of a universal coupling. The bottom roller 44 is connected to the support 28 by bearings 68 and 70. The coupling 66 and the bearings 68 and 70 allow the bottom roller 44 to move in relation to the support 28 by actuators 72 and 74. This allows the bottom roller 44 to be moved toward and away from the stationary top roller 42 thus changing the size of the nip 46. Each of the shafts 48 and 50 is driven independently by its separate drive means 56 and 58, and the bottom roller 44 is driven at greater speed. More specifically, the roller 44 is driven so that its lineal surface velocity is preferably within the range of seven to twelve times faster than the lineal surface velocity of the top roller 42.

Thus, as the sheet 22 passes through the nip 46, the top roller 42 operates as a brake, and the mill reduction may also act as a brake, on the lower surface of the sheet 22 while the bottom roller 44 pulls and accelerates the sheet 22. As the sheet 22 accelerates through the nip 46, it is simultaneously milled and stretched to its final predetermined thickness as it passes through the nip 46. The desired finished sheet 22 exits the nip 46 with a thickness which may be less than the dimension of the nip 46. The thickness of the finished sheet 22 depends on the lineal surface velocity differential between the top roller 42 and the bottom roller 44. The faster the bottom roller 44 rotates the thinner the finished sheet 22 will be. Some stretching may occur slightly before or after the nip 46 depending on the velocity of the bottom roller 44. Thus, there is essentially a zero gap between the milling and stretching functions. One result is that there is substantially less necking of the sheet width in comparison to stretching methods in accordance with prior suggested methods wherein the sheet is stretched only after the milling step has been completed.

After the finished sheet 22 exits the zero gap assembly 20, it winds around the exit bridle assembly 26. The exit bridle assembly 26 may take any one of several forms, and as shown in FIG. 1, includes a plurality of rollers or cylinders 76, 78, 80, 82, 84 and 86 mounted by suitable means, such as a plurality of shafts, not shown, on the support 28. They are used to pull the sheet 22 out of the zero gap assembly 20 properly. The rollers 76, 78, 80, 82, 84 and 86 may be solid or hollow. More or fewer rollers may be employed than the number shown in FIG. 1. The rollers 76, 78, 80, 82, 84 and 86 do not substantially contribute to any stretching of the sheet 22. The rollers 76, 78, 80, 82, 84 and 86 are arranged along two rows with bottom row rollers 78, 82 and 86 being spaced between and at a distance beneath the top row rollers 76, 80 and 84. Rollers 76, 80 and 84 rotate in a clockwise direction while rollers 78, 82 and 86 rotate in a counterclockwise direction so that when the sheet 22 is wound around the exit bridle assembly 32, it travels through the rollers 76, 78, 80, 82, 84 and 86. The rollers 76, 78, 80, 82, 84 and 86 are rotated at a uniform speed by suitable means, not shown, such as a motor and shaft assembly. All of the rollers 76, 78, 80, 82, 84 and 86 rotate at essentially the same lineal surface velocity as the bottom roller 44 in the zero gap assembly 20.

It is to be understood that another stretching step and apparatus, such as a short gap stretch apparatus, may be used in the present invention before or after the zero gap assembly 20 to further modify the characteristics of the sheet 22.

Having disclosed the specifics of the apparatus of the present invention, a method in accordance with the invention will now be discussed.

The sheet 22 feeds from the extruding machine 30 to the entry bridle assembly 32 and winds around the entry bridle rollers 34, 36, 38 and 40 for proper alignment for feeding into the zero gap assembly 20. The sheet 22 then feeds around the top roller of the zero gap assembly 20. The top roller 42 and the entry bridle rollers 34, 36, 38 and 40 are driven at the same lineal surface velocity.

As the sheet 22 enters the assembly 20, it travels around the circumference of the top roller 42 until it reaches the nip 46 defined between the top and bottom rollers 42 and 44. The faster rotating bottom roller 44 pulls the sheet 22 through the nip 46 while the slower rotating top roller 42 and the mill reduction brakes the speed of the lower surface of the sheet 22. Thus, the sheet 22 accelerates through the nip 46 and is simultaneously milled and stretched to its final predetermined thickness as it passes through the nip 46.

The exit bridle assembly 26 pulls the finished sheet 22 off of the bottom roller 44. This method produces a thin, flat oriented sheet 22 that is now ready to be surface treated and/or heat treated as desired and sliced into thin straps as required for use in strapping packages and the like in accordance with known procedures.

The above described apparatus and method produce a significantly better quality strap than prior art methods as illustrated in the table below. Each of the straps that were tested and are compared below are equivalent in material and thickness and have a width of 0.236 inches. The prior art "single draw" method strap referred to in the following table was produced by the SIGNODE® process using a milling step and then drawing and stretching the material as it comes out of the milling rollers.

TABLE 1

|  | Single Draw | Zero Gap |
| --- | --- | --- |
| Tensile Strength KPSI | 45 | 64 |
| Elongation, % | 25 | 13 |
| Modulus @ 2 & 5 KPSI | 400 | 963 |
| Weld Strength Lbs. | 79 | 187 |
| Weld Percent | 55 | 89 |
| Weld Equivalent KPSI | 25 | 57 |
| Split In. | 0.7 | 0.07 |

As shown in the table above, the zero gap method produces a higher tensile strength strapping with a stronger and higher percentage weld. Furthermore, the splitting of the strap is essentially eliminated while still achieving a high tensile strength, whereas in current methods, as the tensile strength is increased, more splitting results and percent of weld strength decreases. Also, since the tensile strength of the zero gap method material is 1.47 times the standard strap and the elongation is about half of the standard strap, better creep performance is achieved. this presents several market advantages in polypropylene materials. Specifically, if the pound's break strength of the strap is controlling the application, then the higher tensile strength of the material will allow a substitution of a strap which involves only seventy percent of the currently used material. If stiffness is the controlling attribute, this method will produce a strap capable of being push-fed reliably around a guide chute of a strapping machine, and if weld strength is the controlling attribute, less than half of the currently used raw material will produce the equivalent pounds of joint strength.

The various properties resulting from this process give significant flexibility of design of a strap for a variety of applications. It is believed that the strap that is produced has a stronger bond across the grain, while still being relatively easy to tear the strap across the grain. Furthermore, the strap produced by the zero gap method does not fail a structural delamination test as do most prior art systems. Since the structural delamination of the strap does not fail, higher weld strength is obtained.

If a pre-stretch step is used between the entry bridle and the zero gap assembly or if a post-stretch step is used between the zero gap assembly and the exit bridle, the same overall characteristics are achieved as the preferred embodiment described herein. A pre-stretch step, however, provides a more forgiving process and a higher tensile modulus can be achieved. A post-stretch step can provide material with greater tendency to fibrillate.

While a preferred embodiment of the present invention is shown and described, it is envisioned that those skilled in the art may devise various modifications of the present invention without departing from the spirit and scope of the appended claims. The invention is not intended to be limited by the foregoing disclosure. It is therefore to be understood that within the scope of the appended claims, the present invention may be practiced otherwise than as specifically described herein.

The invention claimed is:

1. A method of producing a plastic strap, comprising the steps of:
   providing a pair of rollers such that said rollers rotate in opposite directions and at different lineal surface velocities, and wherein said pair of rollers are spaced apart with respect to each other so as to define a nip therebetween; and
   feeding a solid sheet of material, having a thickness which which is greater than said nip defined between said pair of rollers, into said nip defined between said pair of rollers so as simultaneously mill and stretch said solid sheet of material substantially at said nip defined between said rollers during a single pass of said solid sheet material through said nip defined between said rollers rotating in said opposite directions and at said different lineal surface velocities.

2. The method of claim 1, wherein:
   said step of simultaneously milling and stretching said solid sheet of material comprises contacting one side surface of said solid sheet material with a substantial circumferential portion of one of said pair of rollers, and contacting the other side surface of said solid sheet of material with a substantial circumferential portion of the other one of said pair of rollers.

3. The method of claim 2, wherein:
   said one and other side surfaces of said solid sheet of material contact said pair of rollers along said circumferential portions of each one of said rollers wherein each one of said circumferential portions of said rollers is greater than one-half of the circumference of each one of said rollers.

4. The method of claim 1, wherein:
   said step of providing said pair of rollers comprises the step of driving one of said pair of rollers at a first lineal surface velocity, and driving the other one of said pair of rollers at a second lineal surface velocity which is approximately seven to twelve times greater than said first velocity of said one of said pair of rollers.

5. The method of claim 1, wherein:
   said step of milling said solid sheet of material at said nip defined between said pair of rollers thereby reduces said thickness of said solid sheet of material, and said simultaneous stretching of said solid sheet of material is achieved by advancing one side of said solid sheet of material at said nip, defined between said pair of rollers, at a rate faster than an opposite side of said solid sheet of material.

6. A method of producing a plastic strap, comprising the steps of:

providing a pair of rollers spaced apart with respect to each other so as to define a nip therebetween having a first space dimension;

rotating said pair of rollers in opposite directions and at different lineal surface velocities wherein the lineal surface velocity of one of said pair of rollers comprises at least a positive integer number multiple of the lineal surface velocity of the other one of said pair of rollers; and feeding a solid sheet of material, having a thickness dimension which is greater than said first space dimension of said nip defined between said pair of rollers, around circumferential portions of each one of said pair of rollers, which comprise circumferential extents which are greater than one-half of the circumference of each one of said pair of rollers, and into said nip defined between said pair of rollers so as to achieve simultaneous milling and stretching of said solid sheet of material substantially at said nip defined between said pair of rollers and during a single pass of said solid sheet of material through said nip defined between said pair of rollers as said pair of rollers rotate in said opposite directions and at said different lineal surface velocities such that said solid sheet of material has a finalized thickness dimension which is less than said thickness dimension of said solid sheet of material which entered said nip defined between said pair of rollers.

7. A method as set forth in claim 6, wherein:
said pair of rollers are rotated at said different lineal surface velocities such that said finalized thickness dimension of said solid sheet of material, which has been simultaneously milled and stretched within said nip defined between said pair of rollers, has a thickness dimension which is less than said first space dimension defined by said nip defined between said pair of rollers.

8. A method as set forth in claim 6, wherein:
said lineal surface velocity of said one of said pair of rollers is approximately 7–12 times, that of said lineal surface velocity of said other one of said pair of rollers.

9. A method of producing a plastic strap, comprising the steps of:

providing a pair of opposed rollers spaced apart with respect to each other so as to define a nip therebetween having a first space dimension;

rotating said pair of opposed rollers in opposite directions and at different lineal surface velocities wherein the lineal surface velocity of a first downstream one of said pair of opposed rollers, as considered in the direction of travel of a solid sheet of material through said nip defined between said pair of opposed rollers, comprises at least a positive integer multiple of the lineal surface velocity of a second upstream one of said pair of opposed rollers as considered in said direction of travel of said solid sheet of material through said nip defined between said pair of opposed rollers; and feeding said solid sheet Of material, having a first thickness dimension which is greater than said first space dimension of said nip defined between said pair of rollers, around circumferential portions of each one of said pair of rollers and into said nip defined between said pair of opposed rollers so as to achieve simultaneous milling and stretching of said solid sheet of material within said nip defined between said pair of opposed rollers and during a single pass of said solid sheet of material through said nip defined between said pair of opposed rollers as a result of said second upstream one of said pair of opposed rollers braking said solid sheet of material while said first downstream one of said pair of opposed rollers accelerates said solid sheet of material, in view of said different lineal surface velocities of said pair of opposed rollers, whereby said solid sheet of material has a finalized, second thickness dimension which is substantially less than said first thickness dimension of said solid sheet of material before said solid sheet of material was fed into said nip defined between said pair of opposed rollers.

10. A method as set forth in claim 9, wherein:
a first side surface of said solid sheet of material contacts a first circumferential portion of a first one of said pair of opposed rollers, and a second opposite side surface of said solid sheet of material contacts a second circumferential portion of a second one of said pair of opposed rollers.

11. A method as set forth in claim 10, wherein:
said first and second circumferential portions of said first one and said second one of said pair of opposed rollers comprise circumferential extents which are greater than one-half of the circumference of each one of said pair of opposed rollers.

12. A method as set forth in claim 9, wherein:
said pair of opposed rollers are rotated at said different lineal surface velocities such that said finalized second thickness dimension of said solid sheet of material, which has been simultaneously milled and stretched within said nip defined between said pair of rollers, has a thickness dimension which is less than said first space dimension defined by said nip defined between said pair of opposed rollers.

13. A method as set forth in claim 9, wherein:
said lineal surface velocity of said first one of said pair of opposed rollers is approximately 7–12 times that of said lineal surface velocity of said second one of said pair of opposed rollers.

14. A method as set forth in claim 12, wherein:
said lineal surface velocity of said first one of said pair of opposed rollers is approximately 7–12 times that of said lineal surface velocity of said second one of said pair of opposed rollers.

15. A method as set forth in claim 1, wherein:
said pair of rollers are rotated at said different lineal surface velocities such that said solid sheet of material has a finalized thickness, as a result of said simultaneous milling and stretching, which is less than said thickness of said solid sheet of material before said solid sheet of material was fed into said nip defined between said pair of rollers, and which is also less than the space dimension of said nip defined between said pair of rollers.

16. A method as set forth in claim 15, wherein:
said lineal surface velocity of one of said rollers is approximately 7–12 times said lineal surface velocity of the other one of said pair of rollers.

17. The method as set forth in claim 1, further comprising the step of:

stretching said solid sheet of material prior to said feeding of said solid sheet of material into said nip defined between said pair of rollers.

18. The method as set forth in claim 1, further comprising the step of:

stretching said solid sheet of material after said solid sheet of material has been simultaneously milled and stretched within said nip defined between said pair of rollers and after said simultaneously milled and stretched solid sheet of material has exited from said nip defined between said pair of rollers.

19. The method as set forth in claim 1, further comprising the steps of:

stretching said solid sheet of material prior to said feeding of said solid sheet of material into said nip defined between said pair of rollers; and stretching said solid sheet of material after said solid sheet of material has been simultaneously milled and stretched within said nip defined between said pair of rollers and after said simultaneously milled and stretched solid sheet of material has exited from said nip defined between said pair of rollers.

* * * * *